United States Patent [19]

Kudoh

[11] Patent Number: 6,097,932
[45] Date of Patent: Aug. 1, 2000

[54] RADIO SELECTIVE CALLING RECEIVER HAVING MULTIAREA FUNCTION AND A RECEPTION RESTORING METHOD

[75] Inventor: Kazuhiro Kudoh, Shizuoka, Japan

[73] Assignee: NEC Corporation, Tokyo, Japan

[21] Appl. No.: 08/987,651

[22] Filed: Dec. 9, 1997

[30] Foreign Application Priority Data

Dec. 18, 1996 [JP] Japan .................................. 8-338737

[51] Int. Cl.[7] .................................................. H04Q 7/18
[52] U.S. Cl. .................. 455/38.3; 455/343; 370/311; 370/314; 370/350; 370/825.44; 370/825.04; 370/825.2
[58] Field of Search .................. 455/38.3, 343, 455/421, 524, 525, 38.1, 38.2, 31.2, 31.3; 370/311, 350, 313, 370, 314, 509; 340/825.44, 825.2, 825.21, 825.03, 825.04, 825.14, 825.47

[56] References Cited

U.S. PATENT DOCUMENTS

| | | | |
|---|---|---|---|
| 5,039,984 | 8/1991 | Andros et al. | 340/825.44 |
| 5,740,517 | 4/1998 | Aoshima | 455/38.3 |
| 5,826,173 | 10/1998 | Dent | 455/38.3 |
| 5,857,146 | 1/1999 | Kido | 455/38.3 |

FOREIGN PATENT DOCUMENTS

| | | |
|---|---|---|
| 63-217727 | 9/1988 | Japan . |
| 63-303529 | 12/1988 | Japan . |
| 4-207234 | 7/1992 | Japan . |
| 5-291855 | 11/1993 | Japan . |

*Primary Examiner*—Fan Tsang
*Assistant Examiner*—Philip J. Sobutka
*Attorney, Agent, or Firm*—Scully, Scott, Murphy & Presser

[57] ABSTRACT

A radio selective calling receiver having a multiarea function includes a reception channel reception enable/disable information storage means. In a normal operation, only a specific frame is intermittently received using a predetermined first channel. When a synchronization signal is not received in a synchronization state wherein intermittent reception is being performed, the number of times of consecutive nonreception is counted. When the consecutive nonreception count has reached a predetermined value, it is determined that an out-of-area state is set. Before the consecutive nonreception count reaches the predetermined value, the synchronization signal of another frame different from the specific frame is received using another channel other than the first channel, and reception enable/disable information for the another channel is stored. Immediately after the out-of-area state is detected, the specific frame is received using a channel which is recognized, on the basis of the reception enable/disable information, as a channel capable of receiving the synchronization signal.

10 Claims, 6 Drawing Sheets

RADIO SELECTIVE CALLING RECEIVER HAVING MULTIAREA FUNCTION AND A RECEPTION RESTORING METHOD

BACKGROUND OF THE INVENTION

1. Field of the Invention

The present invention relates to a radio selective calling receiver and, more particularly, to a radio selective calling receiver having a multiarea function and a reception restoring method therefor.

2. Description of the Prior Art

Currently, the number of radio selective calling receiver subscribers is steadily increasing. Along with popularization of such radio selective calling receivers, they are made compact and have high-level functions. Additionally, a variety of services are provided.

One of functions of a radio selective calling receiver which have recently received a great deal of attention is a so-called multiarea function. The user who is carrying the radio selective calling receiver sometimes moves among a plurality of areas. If the radio selective calling receiver has the multiarea function, the reception channel is automatically switched by this function, so the user can be called in any area.

Conventionally, the multiarea function of this type collates synchronization of a received signal at the set channel. When mismatching is detected in this synchronization signal collation, the number of times of mismatching is counted and accumulated. When the number of times of accumulation has reached a predetermined value, the reception channel is switched.

Figure 1:
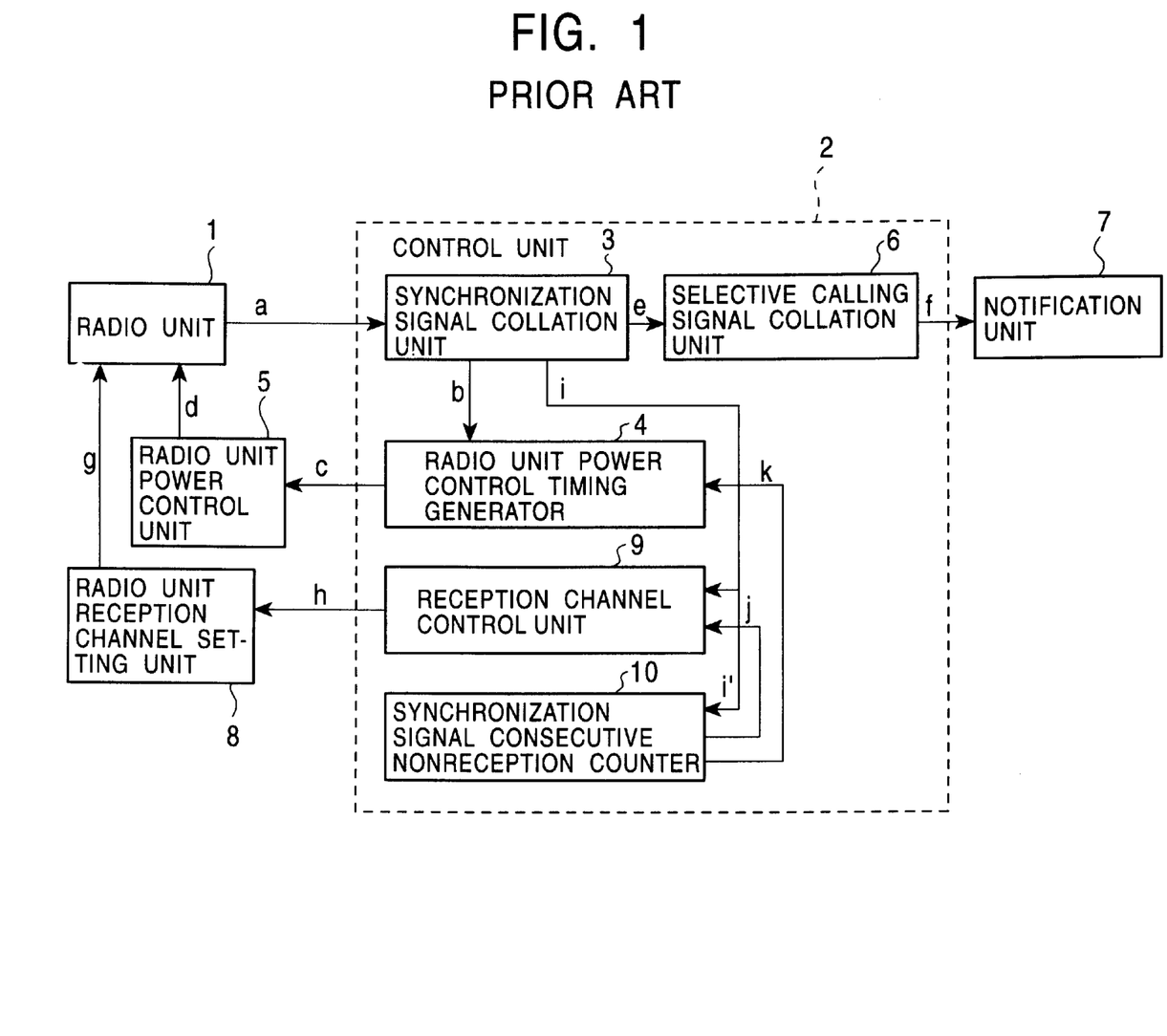
FIG. 1 is a block diagram showing the arrangement of a conventional radio selective calling receiver.
Figure 2A:
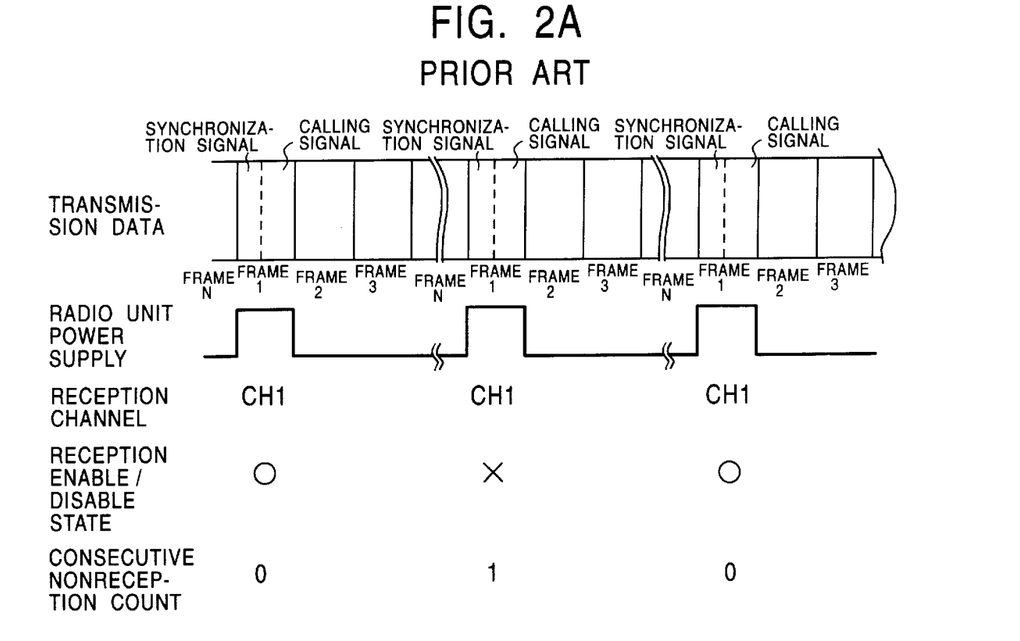
FIG. 2A shows a synchronization state in a normal operation.
Figure 2B:
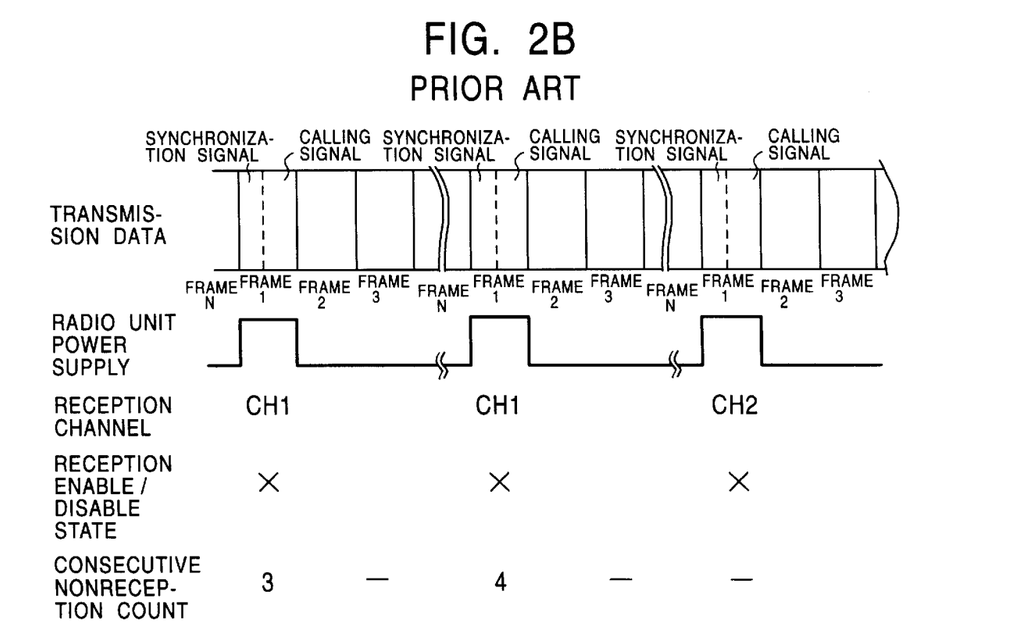
FIG. 2B shows a resynchronization state out of an area.

Channel switching upon an area change will be described below with reference to the block diagram of a conventional radio selective calling receiver shown in FIG. 1 and timing charts shown in FIGS. 2A and 2B. A base station (not shown) in each service area transmits a plurality of frames for every cycle having a predetermined time length. Each frame includes a synchronization signal and a selective calling signal subsequent to the synchronization signal.

To receive a specific frame for the radio selective calling receiver from the plurality of frames sent from the base station (not shown), the received data is sent to a synchronization signal collation unit 3 in a control unit 2 (arrow a).

The synchronization signal collation unit 3 supplies timing information of the data to a radio unit power timing generator 4 in synchronism with the data which has been transmitted from the base station and received by a radio unit 1 (arrow b).

The radio unit power timing generator 4 supplies a control signal for instructing ON/OFF control of the power supply for the radio unit 1 to a radio unit power control unit 5 such that only the specific frame for the radio selective calling receiver is received (arrow c).

The radio unit power control unit 5 ON/OFF-controls the power supply for the radio unit 1 in accordance with this control signal (arrow d). Under this control, the radio unit 1 performs an intermittent operation (battery saving) for every cycle in principle.

When synchronization with the data from the base station is detected by the synchronization signal collation unit 3, a selective calling signal collation unit 6 collates whether the selective calling signal next to the synchronization signal included in the specific frame for the radio selective calling receiver matches the calling signal of the radio selective calling receiver (arrow e). If the two signals match, a notification unit 7 performs notification of calling and displays the message (arrow f).

The reception channel of the radio unit 1 is set by a radio unit reception channel setting unit 8 using, e.g., a PLL control VCO (arrow g). For the first channel setting after power ON, the radio unit reception channel setting unit 8 is controlled by a reception channel control unit 9 such that, of a plurality of reception channels which have been registered in advance, a channel (first channel) with the highest priority is set (arrow h).

If no synchronization signal can be received by the synchronization signal collation unit 3 in the initial state (first channel) (arrow i), the reception channel is switched by the reception channel control unit 9 and the radio unit reception channel setting unit 8 (arrow h) to select a channel where the synchronization signal can be received, and a synchronization state is set to perform intermittent reception using this selected channel.

After reception of the synchronization signal and establishment of the synchronization state, if the synchronization signal of the specific frame for a certain cycle is not received by the synchronization signal collation unit 3, a signal is output to a synchronization signal consecutive nonreception counter 10 (arrows i and i'). When the number of times of consecutive nonreception of the synchronization signal of the specific frame has reached a predetermined value (arrows j and k), an out-of-area state is determined. The radio unit power timing generator 4 and the reception channel control unit 9 receive the specific frame using a channel except the current channel.

As described above, in the conventional radio selective calling receiver, when the number of times of consecutive nonreception of the synchronization signal has reached a predetermined value, the reception channel is sequentially switched on the basis of a certain algorithm. This channel switching is repeated until the synchronization signal can be received.

Each radio selective calling receiver in the service area intermittently receives a specific frame (frame 1 in FIGS. 2A and 2B) assigned to the receiver using a specific frame (CH1 in FIGS. 2A and 2B) as a reception channel. At the same time, battery saving control is performed to turn off the power supply for the radio unit in the nonreception period of intermittent reception. This state is called a synchronization state (FIG. 2A).

If the user of the radio selective calling receiver moves from the current area to another area, reception cannot be continued using the current reception channel, and the reception channel must be switched. For this purpose, the following control is performed.

Every time the radio calling receiver intermittently receives the specific frame, it is determined whether the synchronization signal of the frame has been normally received. If the synchronization signal could not be normally received, the number of times of consecutive nonreception (to be referred to as a consecutive nonreception count hereinafter) is counted.

When the consecutive nonreception count has reached a predetermined value, it is determined that the user is out of the area. An operation for selecting an appropriate channel corresponding to the new area is started. After channel selection, intermittent reception of the specific frame is restarted using the new reception channel (FIG. 2B).

In this case, since the channel to be selected is unknown, the reception (enable/disable state is determined while sequentially switching a plurality of candidate channels. By repeating this processing, an appropriate channel is selected.

The above-described radio selective calling receiver has the following problems.

(1) In the conventional radio selective calling receiver, the reception channel is not switched until the user reaches the boundary of areas and cannot be called. For this reason, before reception is enabled again, not only a time for detecting synchronization signal nonreception the predetermined number of times but also a time for a scanning operation for sequentially switching reception channels in number corresponding to the number of areas where reception by the receiver is enabled is required, so reception is disabled for a long time.

(2) The conventional radio selective calling receiver has large battery consumption. The reason for this is as follows. If the reception channel scanning interval in an area change is made short, resynchronization can be quickly established. However, when the radio wave of the system cannot be received, the out-of-area state, i.e., a state wherein the battery saving effect becomes small continues for a long time, and the battery is consumed.

SUMMARY OF THE INVENTION

The present invention has been made in consideration of the above situation, and has as its object to provide a radio selective calling receiver having a multiarea function which can restore a reception enable state in a short time when the user moves from the current area to another area, and a reception restoring method therefor.

In order to achieve the above object, according to the first aspect of the present invention, there is provided a radio selective calling receiver having a multiarea function, which has battery saving means for, normally, intermittently receiving only a synchronization signal and a selective calling signal contained in a specific frame of a plurality of frames each having a synchronization signal and a selective calling signal and transmitted for every cycle, comprising:

reception channel reception enable/disable information storage unit, wherein, in a normal operation, only the specific frame is intermittently received using a predetermined first channel, when the synchronization signal is not received in a synchronization state wherein intermittent reception is being performed, the number of times of consecutive nonreception is counted, when the consecutive nonreception count has reached a predetermined value, it is determined that an out-of-area state is set, before the consecutive nonreception count reaches the predetermined value, the synchronization signal of another frame different from the specific frame is received using another channel other than the first channel, and reception enable/disable information for another channel is stored, and immediately after the out-of-area state is detected, the specific frame is received using a channel which is recognized, on the basis of the reception enable/disable information, as a channel capable of receiving the synchronization signal.

According to the second aspect of the present invention, there is provided a radio selective calling receiver having a multiarea function, wherein another frame different from the specific frame in the first aspect is separated from the specific frame by an interval corresponding to not less than one frame.

According to the third aspect of the present invention, there is provided a radio selective calling receiver having a multiarea function, which has battery saving means for, normally, intermittently receiving only a synchronization signal and a selective calling signal contained in a specific frame of a plurality of frames each having a synchronization signal and a selective calling signal and transmitted for every cycle, comprising:

reception channel reception enable/disable information storage unit, wherein, in a normal operation, only the specific frame is intermittently received using a predetermined first channel, when the synchronization signal is not received in a synchronization state wherein intermittent reception is being performed, the number of times of consecutive nonreception is counted, when the consecutive nonreception count has reached a predetermined value, it is determined that an out-of-area state is set, before the consecutive nonreception count reaches the predetermined value, the synchronization signal of another frame separated from the specific frame by an interval corresponding to not less than one frame is received using a second channel different from the first channel, and reception enable/disable information for the second channel is stored, when the synchronization signal of the specific frame cannot be received for a next cycle, the synchronization signal of another frame is received using another channel different from the first and second channels, and reception enable/disable information for another channel is stored, and immediately after the out-of-area state is detected, the specific frame is received using a channel which is recognized, on the basis of the reception enable/disable information, as a channel capable of receiving the synchronization signal.

According to the fourth aspect of the present invention, there is provided a radio selective calling receiver having a multiarea function, which has battery saving means for, normally, intermittently receiving only a synchronization signal and a selective calling signal contained in a specific frame of a plurality of frames each having a synchronization signal and a selective calling signal and transmitted for every cycle, comprising:

reception channel reception enable/disable information storage unit, wherein, in a normal operation, only the specific frame is intermittently received using a predetermined first channel, when the synchronization signal is not received in a synchronization state wherein intermittent reception is being performed, the number of times of consecutive nonreception is counted, when the consecutive nonreception count has reached a predetermined value, it is determined that an out-of-area state is set, when the consecutive nonreception count has reached a value smaller than the predetermined value by one, the synchronization signal of another frame separated from the specific frame by an interval corresponding to not less than one frame is received using a second channel different from the first channel, and the synchronization signal is received using another channel different from the first and second channels after another frame in the same cycle, and reception enable/disable information for each channel is stored, and immediately after the out-of-area state is detected, the specific frame is received using a channel which is recognized, on the basis of the reception enable/disable information, as a channel capable of receiving the synchronization signal.

According to the fifth aspect of the present invention, there is provided a radio selective calling receiver having a multiarea function, which has battery saving means for, normally, intermittently receiving only a synchronization signal and a selective calling signal contained in a specific frame of a plurality of frames each having a synchronization signal and a selective calling signal and transmitted for every cycle, comprising:

reception channel reception enable/disable information storage unit, wherein, in a normal operation, only the specific frame is intermittently received using a predetermined first channel, when the synchronization signal is not received in a synchronization state wherein intermittent reception is being performed, the number of times of consecutive nonreception is counted, when the consecutive nonreception count has reached a predetermined value, it is determined that an out-of-area state is set, before the consecutive nonreception count reaches the predetermined value, the synchronization signal of another frame separated from the specific frame by an interval corresponding to not less than one frame is received using another channel different from the first channel, and reception enable/disable information for another channel is stored, and immediately after the out-of-area state is detected, the synchronization signal of another frame is received using a second channel different from the first channel, which is recognized, on the basis of the reception enable/disable information, as a channel capable of receiving the synchronization signal, when the synchronization signal can be received using the second channel, all reception enable/disable information are initialized, and the specific frame is received using the second channel, and when the synchronization signal cannot be received using the second channel, still another channel capable of receiving the synchronization signal is selected to receive the specific frame.

According to the sixth aspect of the present invention, there is provided a reception restoring method for a radio selective calling receiver having a multiarea function, which has battery saving means for, normally, intermittently receiving only a synchronization signal and a selective calling signal contained in a specific frame of a plurality of frames each having a synchronization signal and a selective calling signal and transmitted for every cycle, comprising the steps of:

intermittently receiving only the specific frame using a predetermined first channel in a normal operation;

when the synchronization signal is not received in a synchronization state wherein intermittent reception is being performed, counting the number of times of consecutive nonreception;

when the consecutive nonreception count has reached a predetermined value, determining that an out-of-area state is set, before the consecutive nonreception count reaches the predetermined value, receiving the synchronization signal of another frame different from the specific frame using another channel other than the first channel, and storing reception enable/disable information for another channel; and immediately after the out-of-area state is detected, receiving the specific frame using a channel which is recognized, on the basis of the reception enable/disable information, as a channel capable of receiving the synchronization signal.

According to the seventh aspect of the present invention, there is provided a reception restoring method for a radio selective calling receiver having a multiarea function, wherein another frame different from the specific frame in the sixth aspect is separated from the specific frame by an interval corresponding to not less than one frame.

According to the eighth aspect of the present invention, there is provided a reception restoring method for a radio selective calling receiver having a multiarea function, which has battery saving means for, normally, intermittently receiving only a synchronization signal and a selective calling signal contained in a specific frame of a plurality of frames each having a synchronization signal and a selective calling signal and transmitted for every cycle, comprising the steps of:

intermittently receiving only the specific frame using a predetermined first channel in a normal operation;

when the synchronization signal is not received in a synchronization state wherein intermittent reception is being performed, counting the number of times of consecutive nonreception;

when the consecutive nonreception count has reached a predetermined value, determining that an out-of-area state is set, before the consecutive nonreception count reaches the predetermined value, receiving the synchronization signal of another frame separated from the specific frame by an interval corresponding to not less than one frame using a second channel different from the first channel, and storing reception enable/disable information for the second channel;

when the synchronization signal of the specific frame cannot be received for a next cycle, receiving the synchronization signal of another frame using another channel different from the first and second channels, and storing reception enable/disable information for another channel; and immediately after the out-of-area state is detected, receiving the specific frame using a channel which is recognized, on the basis of the reception enable/disable information, as a channel capable of receiving the synchronization signal.

According to the ninth aspect of the present invention, there is provided a reception restoring method for a radio selective calling receiver having a multiarea function, which has battery saving means for, normally, intermittently receiving only a synchronization signal and a selective calling signal contained in a specific frame of a plurality of frames each having a synchronization signal and a selective calling signal and transmitted for every cycle, comprising the steps of:

intermittently receiving only the specific frame using a predetermined first channel in a normal operation;

when the synchronization signal is not received in a synchronization state wherein intermittent reception is being performed, counting the number of times of consecutive nonreception;

when the consecutive nonreception count has reached a predetermined value, determining that an out-of-area state is set, when the consecutive nonreception count has reached a value smaller than the predetermined value by one, receiving the synchronization signal of another frame separated from the specific frame by an interval corresponding to not less than one frame using a second channel different from the first channel and receiving the synchronization signal using another channel different from the first and second channels after another frame in the same cycle, and storing reception enable/disable information for each channel; and immediately after the out-of-area state is detected, receiving the specific frame using a channel which is recognized, on the basis of the reception enable/disable information, as a channel capable of receiving the synchronization signal.

According to the 10th aspect of the present invention, there is provided a reception restoring method for a radio selective calling receiver having a multiarea function, which has battery saving means for, normally, intermittently receiving only a synchronization signal and a selective calling signal contained in a specific frame of a plurality of frames each having a synchronization signal and a selective calling signal and transmitted for every cycle, comprising the steps of:

intermittently receiving only the specific frame using a predetermined first channel in a normal operation;

when the synchronization signal is not received in a synchronization state wherein intermittent reception is being performed, counting the number of times of consecutive nonreception;

when the consecutive nonreception count has reached a predetermined value, determining that an out-of-area state is set, before the consecutive nonreception count reaches the predetermined value, receiving the synchronization signal of another frame separated from the specific frame by an interval corresponding to not less than one frame using another channel different from the first channel, and storing reception enable/disable information for another channel; and immediately after the out-of-area state is detected, receiving the synchronization signal of another frame using a second channel different from the first channel, which is recognized, on the basis of the reception enable/disable information, as a channel capable of receiving the synchronization signal, when the synchronization signal can be received using the second channel, initializing all reception enable/disable information, and receiving the specific frame using the second channel, and when the synchronization signal cannot be received using the second channel, selecting still another channel capable of receiving the synchronization signal to receive the specific frame.

According to the present invention having the above aspects, the reception channel is automatically switched when the area changes. In the next cycle immediately after the out-of-area state is set due to the area change, reception using a channel which can receive the synchronization signal can be restarted. With this arrangement, a reliable and high-level functional radio selective calling receiver which can minimize a loss in reception opportunities, and a reception restoring method therefor can be realized. In addition, according to the present invention, as a means for determining the reception enable/disable state using another channel other than the current channel, not a field detector using an A/D converter or the like but a hardware arrangement for performing timing control for a reception channel control unit and a radio unit power supply, which are originally arranged in the receiver, is used. For this reason, the above effect can be obtained at a low cost using a very simple and small arrangement. Furthermore, only when the synchronization signal of the specific frame is not received, the synchronization signal of another frame is received, and reception channel scanning for area change is performed. Therefore, a large battery saving effect can be obtained.

The above and many other objects, features and advantages of the present invention will become manifest to those skilled in the art upon making reference to the following detailed description and accompanying drawings in which preferred embodiments incorporating the principles of the present invention are shown by way of illustrative examples.

BRIEF DESCRIPTION OF THE DRAWINGS

FIGS. 2A and 2B are timing charts showing the reception states of the conventional radio selective calling receiver shown in FIG. 1, in which

FIGS. 6A and 6B are timing charts showing the reception states of the radio selective calling receiver shown in FIG. 3, in which

DETAILED DESCRIPTION OF THE PREFERRED EMBODIMENTS

Preferred embodiments of the present invention will be described below with reference to the accompanying drawings.

Figure 3:
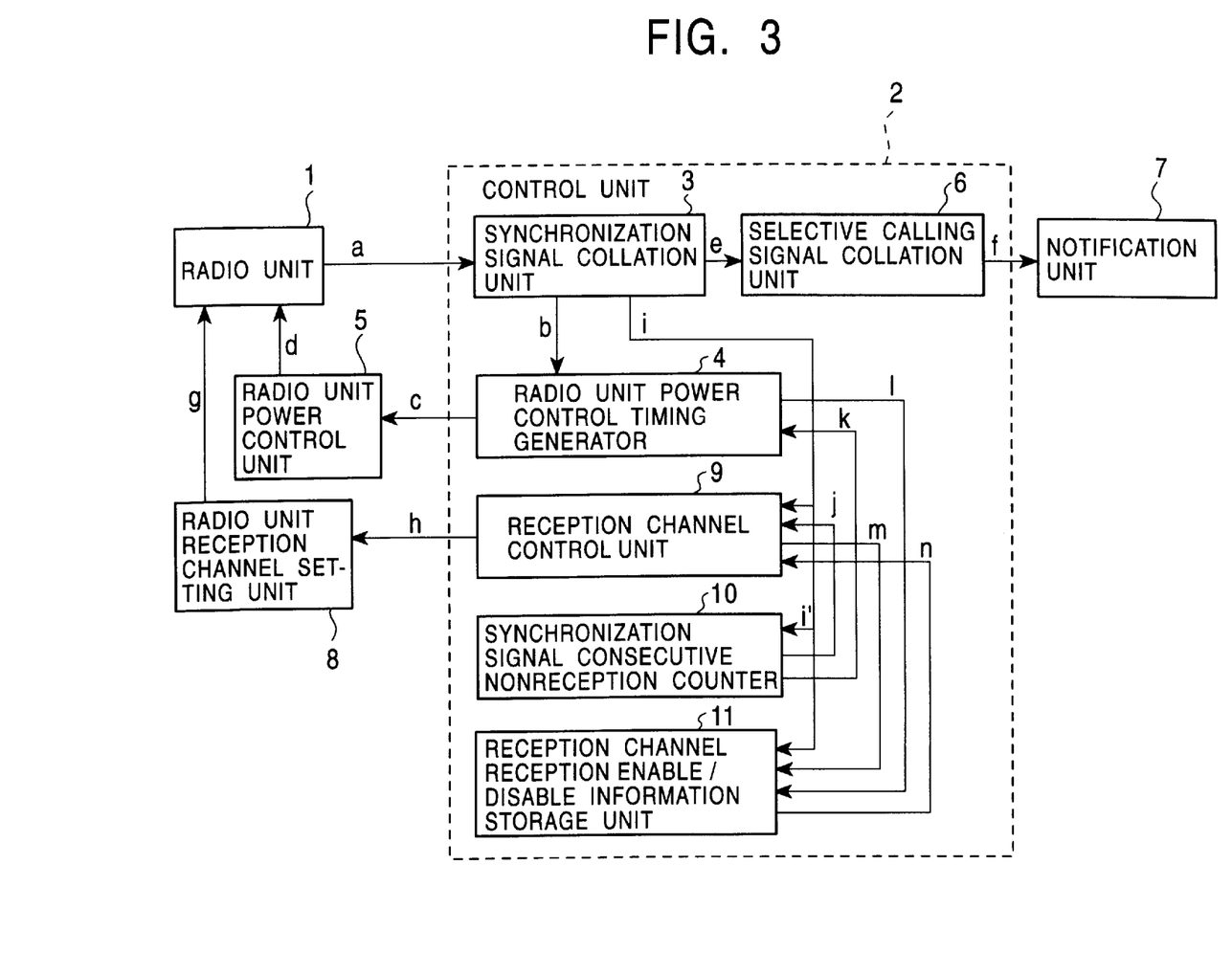
FIG. 3 is a block diagram showing the arrangement of a radio selective calling receiver according to an embodiment of the present invention.

FIG. 3 is a block diagram showing the arrangement of a radio selective calling receiver according to an embodiment of the present invention. As described above, a base station (not shown) transmits a plurality of frames for one cycle. A specific frame containing a synchronization signal and a selective calling signal for specifying the radio selective calling receiver is included in the plurality of frames transmitted for one cycle.

To receive a specific frame for the radio selective calling receiver from the plurality of sent frames, a radio unit 1 of the radio selective calling receiver of this embodiment sends the received data to a synchronization signal collation unit 3 in a control unit 2 (arrow a).

The synchronization signal collation unit 3 supplies timing information of the data to a radio unit power control timing generator 4 in synchronism with the data which has been transmitted from the base station and received by a radio unit 1 (arrow b).

The radio unit power control timing generator 4 supplies a control signal for instructing ON/OFF control of the power supply for the radio unit 1 to a radio unit power control unit 5 such that only the specific frame for the radio selective calling receiver is received (arrow c).

The radio unit power control unit 5 ON/OFF-controls the power supply for the radio unit 1 in accordance with this control signal (arrow d). Under this control, the radio unit 1 performs an intermittent operation (battery saving) for every cycle in principle.

When synchronization with the data from the base station is detected by the synchronization signal collation unit 3, a selective calling signal collation unit 6 collates whether the selective calling signal next to the synchronization signal included in the specific frame for the radio selective calling receiver matches the calling signal of the radio selective calling receiver (arrow e). If the two signals match, a notification unit 7 performs notification of calling and displays the message (arrow f).

The reception channel of the radio unit 1 is set by a radio unit reception channel setting unit 8 using, e.g., a PLL control VCO (arrow g). For the first channel setting after power ON, the radio unit reception channel setting unit 8 is controlled by a reception channel control unit 9 such that, of a plurality of reception channels which have been registered in advance, a channel (to be referred to as a first channel herein) with the highest priority is set (arrow h).

If no synchronization signal can be received by the synchronization signal collation unit 3 in the initial state (first channel) (arrow i), the reception channel is switched by the reception channel control unit 9 and the radio unit reception channel setting unit 8 (arrow h) to select a channel where the synchronization signal can be received, and a synchronization state is set to perform intermittent reception using this selected channel.

After reception of the synchronization signal and establishment of the synchronization state, if the synchronization signal collation unit 3 cannot receive the synchronization signal of the specific frame for a certain cycle, a control signal is sent to a synchronization signal consecutive nonreception counter 10, the radio unit power control timing generator 4, and the reception channel control unit 9 (arrows i, d, and i'). Before the specific frame consecutive nonreception count has reached a predetermined value (arrows j and k), the radio unit power control timing generator 4 turns on the power supply for the radio unit 1 not only at the timing of receiving the specific frame but also at the timing of receiving another frame which is separated from the specific frame by one or more frame intervals (arrow c). At this time, the reception channel control unit 9 sequentially sets channels except the current channel (arrow h). Synchronization signal reception enable/disable information for each channel other than the current channel in another frame is stored in a reception channel reception enable/disable information storage unit 11 through the output (i) from the synchronization signal collation unit 3, the output (l) from the radio unit power control timing generator 4, and the output (m) from the reception channel control unit 9.

The number of times of specific frame synchronization signal consecutive nonreception is counted by the synchronization signal consecutive nonreception counter 10 and supplied to the radio unit power control timing generator 4 and the reception channel control unit 9 (arrows j and k). When this consecutive nonreception count has reached a predetermined value, it is determined that an out-of-area state is set. The radio unit power control timing generator 4 and the reception channel control unit 9 select a channel other than the current channel, which can receive the specific frame, on the basis of the output signal (n) from the reception channel reception enable/disable information storage unit 11 and perform control such that the specific frame is received using the selected channel.

Figure 4:
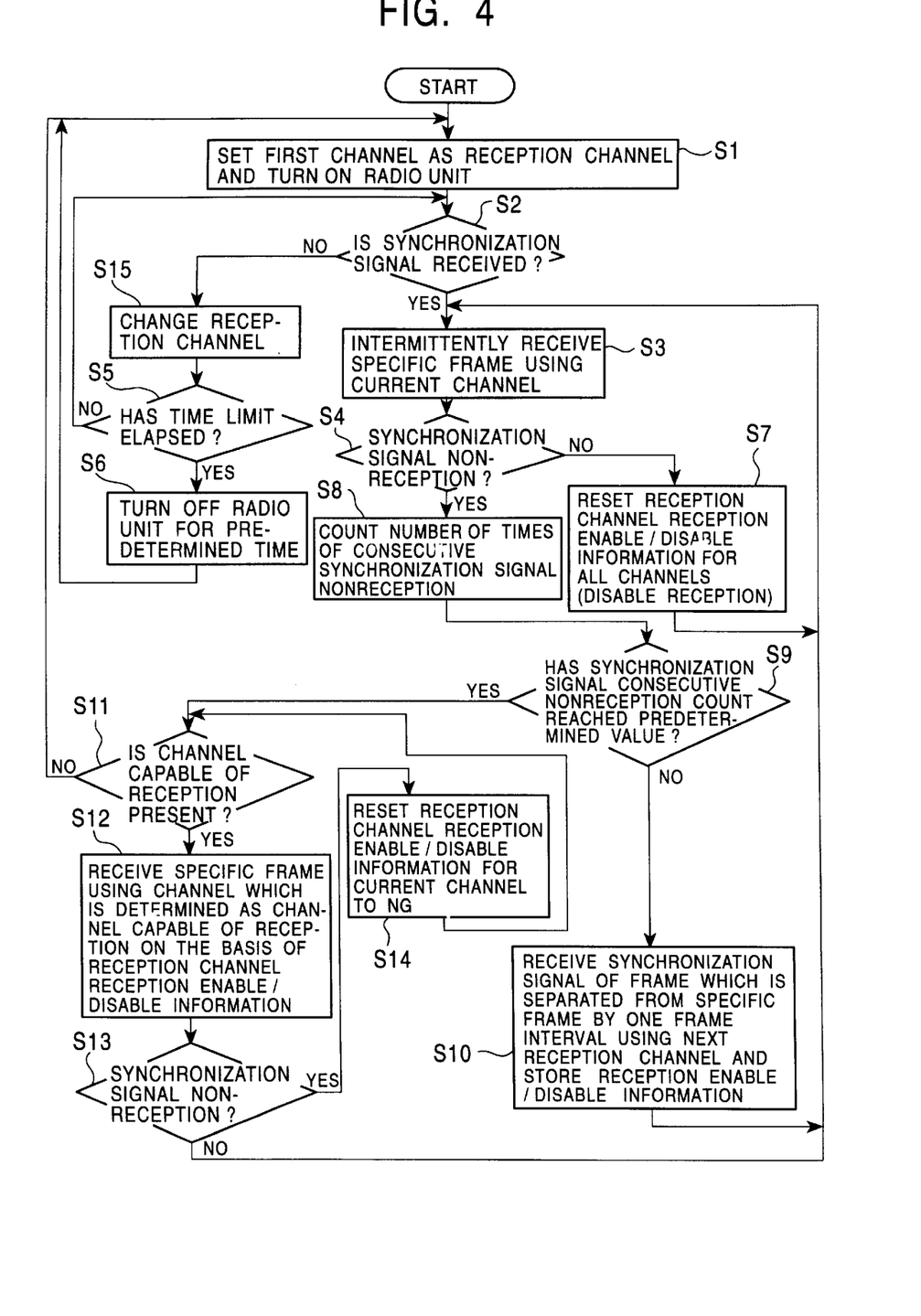
FIG. 4 is a flow chart showing the operation of the radio selective calling receiver shown in FIG. 3.
Figure 6A:
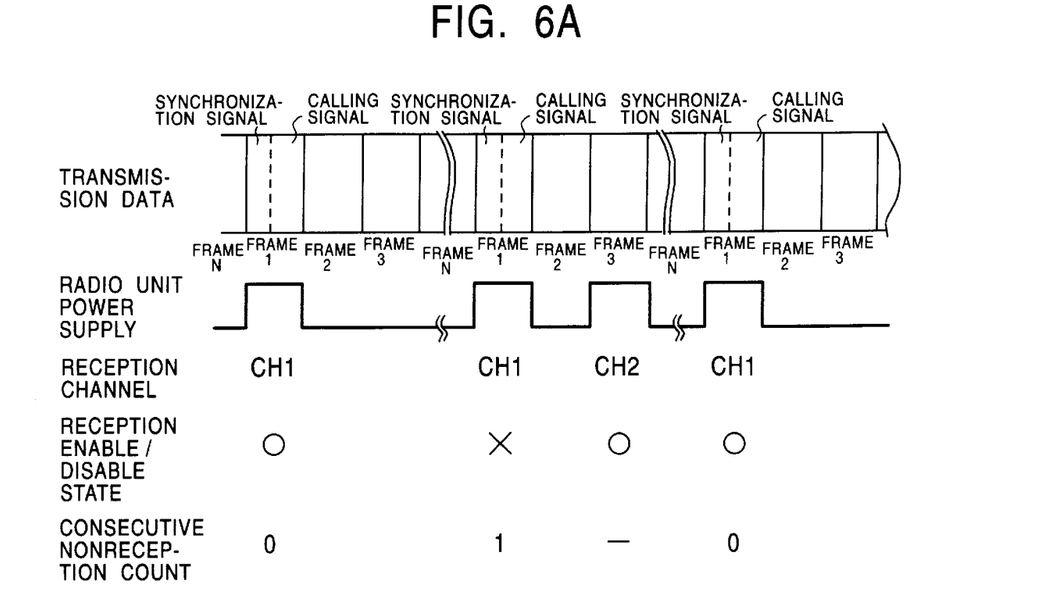
FIG. 6A shows a synchronization state in a normal operation.
Figure 6B:
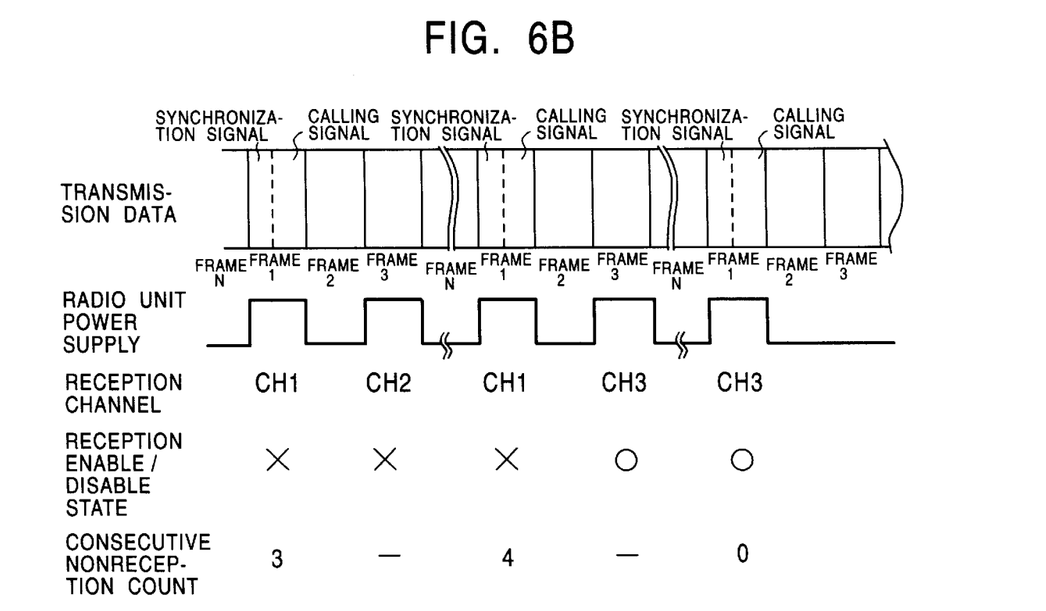
FIG. 6B shows a resynchronization state out of an area.

FIG. 4 is a flow chart showing the operation of the radio selective calling receiver according to the first embodiment of the present invention. FIGS. 6A and 6B are timing charts showing the reception operations of the receiver. The operation of the first embodiment will be described below with reference to these drawings.

When the power supply is turned on, initial channel setting is performed. In this initial channel setting, the reception channel control unit 9 controls the radio unit reception channel setting unit 8 such that, of a plurality of reception channels which have been registered in advance, the first channel with the highest priority is set (step S1).

The radio unit 1 sends the received data to the synchronization signal collation unit 3 in the control unit 2. If the synchronization signal from the base station can be received (step S2), the synchronization signal collation unit 3 outputs timing information of the data from the base station to the radio unit power control timing generator 4. The radio unit power control timing generator 4 outputs a control signal for ON/OFF-controlling the power supply for the radio unit 1 such that only the specific frame as a reception target is received (step S3).

If the synchronization signal collation unit 3 cannot receive the synchronization signal in the initial state (first channel), the reception channel is switched by the reception channel control unit 9 and the radio unit reception channel setting unit 8 (step S15) to select a channel where the synchronization signal can be received (step S2), and a synchronization state is set to perform intermittent reception using this selected channel. More specifically, the synchronization signal collation unit 3 outputs the timing information of the data from the base station to the radio unit power control timing generator 4. The radio unit power control timing generator 4 outputs a control signal for ON/OFF-controlling the power supply for the radio unit 1 such that only the specific frame as a reception target is received (step S3).

Even if the reception channel is changed (step S15), when the time limit has elapsed before a channel capable of receiving the synchronization signal is found (step S5), the radio unit is turned off for a predetermined time by the radio unit power control timing generator 4 and the radio unit power control unit 5 to prevent consumption of the battery (step S6).

When the synchronization signal of the specific frame has been received (step S4), the radio unit power control unit 5 supplies power to the radio unit 1 in accordance with the control signal (arrow c) from the control unit (arrow d) so the radio unit 1 intermittently operates for every cycle in principle (step S3). When the synchronization signal has been received in step S4, reception channel reception enable/disable information of all channels is reset (step S7) although the information is stored in the reception channel reception enable/disable information storage unit 11 due to synchronization signal nonreception, as will be described later, and intermittent reception is performed (step S3).

After reception of the synchronization signal and establishment of the synchronization state, if the synchronization signal collation unit 3 cannot receive the synchronization signal of the specific frame for a certain cycle (step S4), a control signal is sent to the synchronization signal consecutive nonreception counter 10, the radio unit power control timing generator 4, and the reception channel control unit 9. At this time, the synchronization signal consecutive nonreception counter 10 counts the number of times of consecutive nonreception (step S8). Until the specific frame consecutive nonreception count has reached a predetermined value (step S9), the radio unit power control timing generator 4 turns on the power supply for the radio unit 1 not only at the timing of receiving the specific frame but also at the timing of receiving another frame which is separated from the specific frame by one or more frame intervals. The reception channel control unit 9 sequentially sets channels except the current channel. Information representing synchronization signal reception enable/disable state for each channel other than the current channel in another frame is stored in the reception channel reception enable/disable information storage unit 11 (step S10).

Processing in step S10 may be performed over a plurality of cycles. More specifically, if the synchronization signal is not received for a certain cycle, the flow advances to step S10. At this time, the synchronization signal of another frame separated from the specific frame by one or more frame intervals is received using the second channel different from the first channel, and reception enable/disable information for the second channel is stored. If the synchronization signal is not received even for the next cycle, the flow advances to step S10 again. In step S10 for the second time, the synchronization signal of still another frame is received using a channel other than the first and second channels, and reception enable/disable information for this channel is stored. When the operation of obtaining a channel where the synchronization signal can be received is to be performed at a higher speed, the operation of obtaining the channel capable of receiving the synchronization signal may be performed using not only the above-described another frame but also still another frame subsequent to the frame.

When the specific frame synchronization signal consecutive nonreception count has reached a predetermined value (step S9), it is determined that the out-of-area state is set. The radio unit power control timing generator 4 and the reception channel control unit 9 select a channel except the current channel, which can receive the synchronization signal, on the basis of the output signal (n) from the reception channel reception enable/disable information storage unit 11, and perform control such that the specific frame is received using the selected channel (steps S11 and S12).

However, if the synchronization signal is not received (step S13), the reception channel reception enable/disable information corresponding to the current channel is rewritten to contents corresponding to an NG state (step S14), and the synchronization signal is received using other reception channels (steps S11 and S12). If no channels can receive the synchronization signal (step S11), the initial state immediately after the receiver is turned on is set again (step S1).

In the synchronization state during the normal operation, the specific frame (frame 1 in this case) is intermittently received for every cycle, as shown in FIG. 6A. If the synchronization signal is not received, another frame (e.g., frame 3) is received using another channel (second channel), and reception enable/disable information for this channel is stored. If the synchronization signal of the specific frame (frame 1) can be received for the next cycle, the consecutive nonreception count and reception enable/disable information for all channels are reset, so the synchronization state is continuously set.

However, if the reception state of the current channel degrades, and the synchronization signal cannot be received consecutively, e.g., four times, as shown in FIG. 6B, it is determined that the out-of-area state is set.

Until the timing of the next specific frame starts after the four-time consecutive nonreception, reception enable/disable information for other channels (second and third channels) are stored. For this reason, for a cycle immediately after the out-of-area state is set, the synchronization signal can be immediately received using a channel (third channel) which can receive the synchronization signal, so the synchronization state can be quickly restored.

Figure 5:
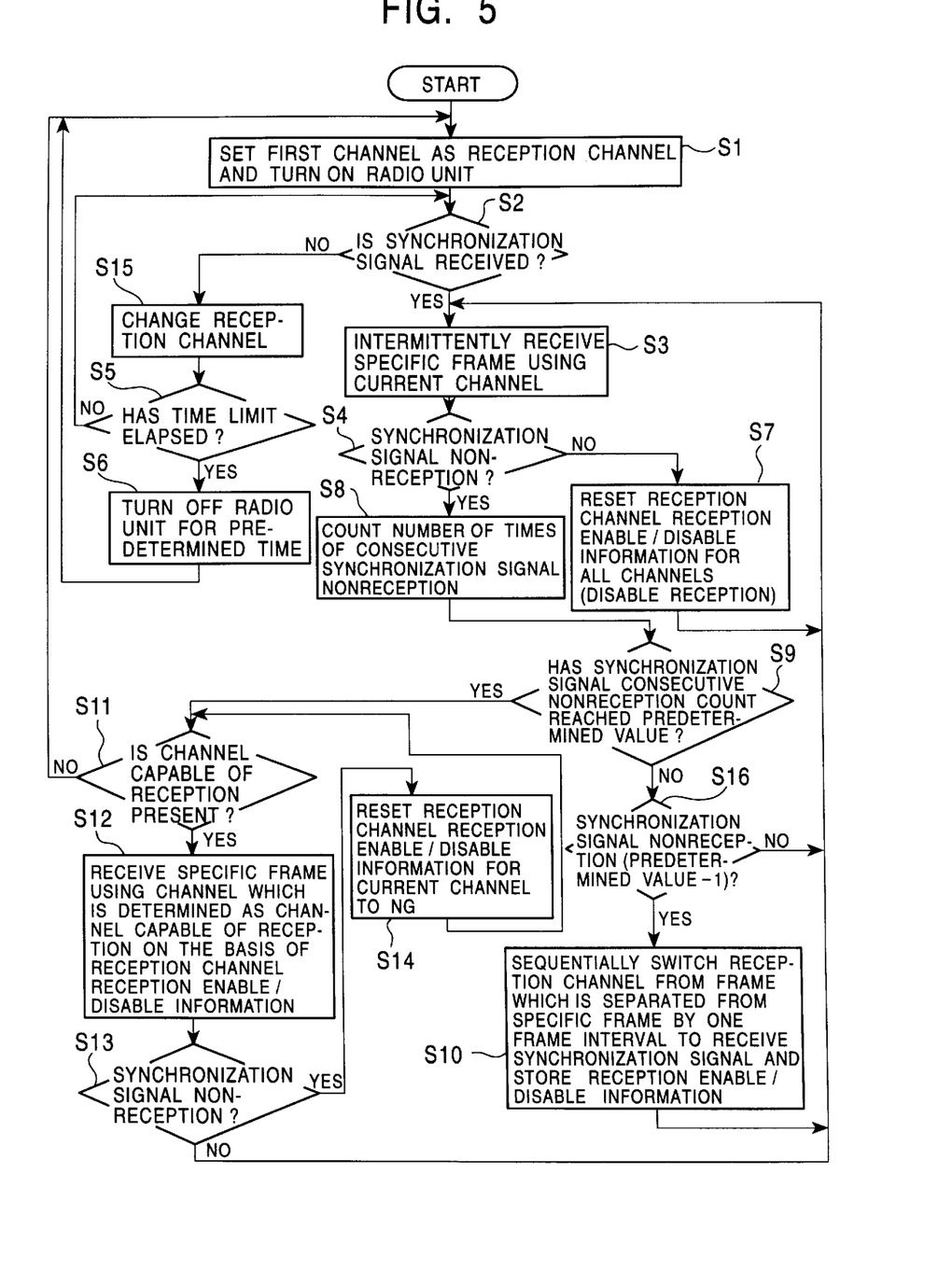
FIG. 5 is a flow chart showing the operation of a radio selective calling receiver according to another embodiment of the present invention.

FIG. 5 is a flow chart showing a modification of the above-described operation of the radio selective calling receiver according to the first embodiment.

This modification is different from the first embodiment only in that step S16 is added. In this modification, after the synchronization signal is received and the synchronization state is set, if the synchronization signal collation unit 3 cannot receive the synchronization signal of the specific frame for a certain cycle (step S4), a control signal is sent to the synchronization signal consecutive nonreception counter 10, the radio unit power control timing generator 4, and the reception channel control unit 9, as in the above embodiment (step S8). In this modification, if the specific frame consecutive nonreception count does not reach (predetermined value−1) (step S16), the radio unit power control timing generator 4 continues intermittent reception (step S3). If the consecutive nonreception count has reached (predetermined value−1) (step S16), the radio unit power control timing generator 4 turns on the power supply for the radio unit 1 not only at the timing of receiving the specific frame but also at the timing of receiving another frame which is separated from the specific frame by one or more frame intervals. The reception channel control unit 9 sequentially sets channels except the current channel. Information representing synchronization signal reception enable/disable state for each channel other than the current channel in another frame is stored in the reception channel reception enable/disable information storage unit 11 (step S10). The remaining operation is the same as in the first embodiment.

In this modification, only when the consecutive nonreception count has reached (predetermined value−1), i.e., immediately before the out-of-area state is set, the synchronization signal is received using another channel other than the current channel, and reception enable/disable information is stored. With this arrangement, the power consumption can be further reduced.

What is claimed is:
1. A radio selective calling receiver having a multiarea function, which has battery saving means for, normally, intermittently receiving only a synchronization signal and a selective calling signal contained in a specific frame of a plurality of frames each having a synchronization signal and a selective calling signal and transmitted for every cycle, comprising:

reception channel reception enable/disable information storage means, wherein, in a normal operation, only said specific frame is intermittently received using a predetermined first channel, when the synchronization signal is not received in a synchronization state wherein intermittent reception is being performed, the number of times of consecutive nonreception is counted, when the consecutive nonreception count has reached a predetermined value, it is determined that an out-of-area state is set, before the consecutive nonreception count reaches the predetermined value, the synchronization signal of another frame different from said specific frame is received using another channel other than said first channel, and reception enable/disable information for said another channel is stored, and immediately after the out-of-area state is detected, said specific frame is received using a channel which is recognized, on the basis of the reception enable/disable information, as a channel capable of receiving the synchronization signal.

2. A receiver according to claim 1, wherein said another frame different from said specific frame is separated from said specific frame by an interval corresponding to not less than one frame.

3. A radio selective calling receiver having a multiarea function, which has battery saving means for, normally, intermittently receiving only a synchronization signal and a selective calling signal contained in a specific frame of a plurality of frames each having a synchronization signal and a selective calling signal and transmitted for every cycle, comprising:

reception channel reception enable/disable information storage means, wherein, in a normal operation, only said specific frame is intermittently received using a predetermined first channel, when the synchronization signal is not received in a synchronization state wherein intermittent reception is being performed, the number of times of consecutive nonreception is counted, when the consecutive nonreception count has reached a predetermined value, it is determined that an out-of-area state is set, before the consecutive nonreception count reaches the predetermined value, the synchronization signal of another frame separated from said specific frame by an interval corresponding to not less than one frame is received using a second channel different from said first channel, and reception enable/disable information for said second channel is stored, when the synchronization signal of said specific frame cannot be received for a next cycle, the synchronization signal of said another frame is received using another channel different from said first and second channels, and reception enable/disable information for said another channel is stored, and immediately after the out-of-area state is detected, said specific frame is received using a channel which is recognized, on the basis of the reception enable/disable information, as a channel capable of receiving the synchronization signal.

4. A radio selective calling receiver having a multiarea function, which has battery saving means for, normally, intermittently receiving only a synchronization signal and a selective calling signal contained in a specific frame of a plurality of frames each having a synchronization signal and a selective calling signal and transmitted for every cycle, comprising:

reception channel reception enable/disable information storage means, wherein, in a normal operation, only said specific frame is intermittently received using a predetermined first channel, when the synchronization signal is not received in a synchronization state wherein intermittent reception is being performed, the number of times of consecutive nonreception is counted, when the consecutive nonreception count has reached a predetermined value, it is determined that an out-of-area state is set, when the consecutive nonreception count has reached a value smaller than the predetermined value by one, the synchronization signal of another frame separated from said specific frame by an interval corresponding to not less than one frame is received using a second channel different from said first channel, and the synchronization signal is received using another channel different from said first and second channels after said another frame in the same cycle, and reception enable/disable information for each channel is stored, and immediately after the out-of-area state is detected, said specific frame is received using a channel which is recognized, on the basis of the reception enable/disable information, as a channel capable of receiving the synchronization signal.

5. A radio selective calling receiver having a multiarea function, which has battery saving means for, normally, intermittently receiving only a synchronization signal and a selective calling signal contained in a specific frame of a plurality of frames each having a synchronization signal and a selective calling signal and transmitted for every cycle, comprising:

reception channel reception enable/disable information storage means, wherein, in a normal operation, only said specific frame is intermittently received using a predetermined first channel, when the synchronization signal is not received in a synchronization state wherein intermittent reception is being performed, the number of times of consecutive nonreception is counted, when the consecutive nonreception count has reached a predetermined value, it is determined that an out-of-area state is set, before the consecutive nonreception count reaches the predetermined value, the synchronization signal of another frame separated from said specific frame by an interval corresponding to not less than one frame is received using another channel different from said first channel, and reception enable/disable information for said another channel is stored, and immediately after the out-of-area state is detected, the synchronization signal of said another frame is received using a second channel different from said first channel, which is recognized, on the basis of the reception enable/disable information, as a channel capable of receiving the synchronization signal, when the synchronization signal can be received using said second channel, all reception enable/disable information are initialized, and said specific frame is received using said second channel, and when the synchronization signal cannot be received using said second channel, still another channel capable of receiving the synchronization signal is selected to receive said specific frame.

6. A reception restoring method for a radio selective calling receiver having a multiarea function, which has battery saving means for, normally, intermittently receiving only a synchronization signal and a selective calling signal contained in a specific frame of a plurality of frames each having a synchronization signal and a selective calling signal and transmitted for every cycle, comprising the steps of:

intermittently receiving only said specific frame using a predetermined first channel in a normal operation;

when the synchronization signal is not received in a synchronization state wherein intermittent reception is being performed, counting the number of times of consecutive nonreception;

when the consecutive nonreception count has reached a predetermined value, determining that an out-of-area state is set, before the consecutive nonreception count reaches the predetermined value, receiving the synchronization signal of another frame different from said specific frame using another channel other than said first channel, and storing reception enable/disable information for said another channel; and immediately after the out-of-area state is detected, receiving said specific frame using a channel which is recognized, on the basis of the reception enable/disable information, as a channel capable of receiving the synchronization signal.

7. A method according to claim 6, wherein said another frame different from said specific frame is separated from said specific frame by an interval corresponding to not less than one frame.

8. A reception restoring method for a radio selective calling receiver having a multiarea function, which has battery saving means for, normally, intermittently receiving only a synchronization signal and a selective calling signal contained in a specific frame of a plurality of frames each having a synchronization signal and a selective calling signal and transmitted for every cycle, comprising the steps of:

intermittently receiving only said specific frame using a predetermined first channel in a normal operation;

when the synchronization signal is not received in a synchronization state wherein intermittent reception is being performed, counting the number of times of consecutive nonreception;

when the consecutive nonreception count has reached a predetermined value, determining that an out-of-area state is set, before the consecutive nonreception count reaches the predetermined value, receiving the synchronization signal of another frame separated from said specific frame by an interval corresponding to not less than one frame using a second channel different from said first channel, and storing reception enable/disable information for said second channel;

when the synchronization signal of said specific frame cannot be received for a next cycle, receiving the synchronization signal of said another frame using another channel different from said first and second channels, and storing reception enable/disable information for said another channel; and immediately after the out-of-area state is detected, receiving said specific frame using a channel which is recognized, on the basis of the reception enable/disable information, as a channel capable of receiving the synchronization signal.

9. A reception restoring method for a radio selective calling receiver having a multiarea function, which has battery saving means for, normally, intermittently receiving only a synchronization signal and a selective calling signal contained in a specific frame of a plurality of frames each having a synchronization signal and a selective calling signal and transmitted for every cycle, comprising the steps of:

intermittently receiving only said specific frame using a predetermined first channel in a normal operation;

when the synchronization signal is not received in a synchronization state wherein intermittent reception is being performed, counting the number of times of consecutive nonreception;

when the consecutive nonreception count has reached a predetermined value, determining that an out-of-area state is set, when the consecutive nonreception count has reached a value smaller than the predetermined value by one, receiving the synchronization signal of another frame separated from said specific frame by an interval corresponding to not less than one frame using a second channel different from said first channel and receiving the synchronization signal using another channel different from said first and second channels after said another frame in the same cycle, and storing reception enable/disable information for each channel; and immediately after the out-of-area state is detected, receiving said specific frame using a channel which is recognized, on the basis of the reception enable/disable information, as a channel capable of receiving the synchronization signal.

10. A reception restoring method for a radio selective calling receiver having a multiarea function, which has battery saving means for, normally, intermittently receiving only a synchronization signal and a selective calling signal contained in a specific frame of a plurality of frames each having a synchronization signal and a selective calling signal and transmitted for every cycle, comprising the steps of:

intermittently receiving only said specific frame using a predetermined first channel in a normal operation;

when the synchronization signal is not received in a synchronization state wherein intermittent reception is being performed, counting the number of times of consecutive nonreception;

when the consecutive nonreception count has reached a predetermined value, determining that an out-of-area state is set, before the consecutive nonreception count reaches the predetermined value, receiving the synchronization signal of another frame separated from said specific frame by an interval corresponding to not less than one frame using another channel different from said first channel, and storing reception enable/disable information for said another channel; and immediately after the out-of-area state is detected, receiving the synchronization signal of said another frame using a second channel different from said first channel, which is recognized, on the basis of the reception enable/disable information, as a channel capable of receiving the synchronization signal, when the synchronization signal can be received using said second channel, initializing all reception enable/disable information, and receiving said specific frame using said second channel, and when the synchronization signal cannot be received using said second channel, selecting still another channel capable of receiving the synchronization signal to receive said specific frame.

* * * * *